United States Patent [19]

Taniguchi

[11] Patent Number: 5,434,809
[45] Date of Patent: Jul. 18, 1995

[54] METHOD AND APPARATUS FOR PERFORMING FLOATING POINT ARITHMETIC OPERATION AND ROUNDING THE RESULT THEREOF

[75] Inventor: Takashi Taniguchi, Osaka, Japan

[73] Assignee: Matsushita Electric Industrial Co., Ltd., Osaka, Japan

[21] Appl. No.: 219,560

[22] Filed: Mar. 29, 1994

Related U.S. Application Data

[62] Division of Ser. No. 12,220, Feb. 2, 1993, Pat. No. 5,313,415, which is a division of Ser. No. 596,116, Oct. 11, 1990, Pat. No. 5,212,661.

[30] Foreign Application Priority Data

Oct. 16, 1989 [JP]   Japan ................... 1-268447

[51] Int. Cl.⁶ .............................................. G06F 7/38
[52] U.S. Cl. .................................... 364/752; 364/745; 364/748
[58] Field of Search ............... 364/735, 736, 745, 748, 364/761–764, 752

[56] References Cited

U.S. PATENT DOCUMENTS

| | | | |
|---|---|---|---|
| H1,222 | 8/1993 | Brown et al. ................. | 364/748 |
| 4,785,412 | 11/1988 | Tran ............................. | 364/761 |
| 4,789,955 | 12/1988 | Umetani ....................... | 364/745 |
| 4,798,972 | 7/1988 | Frazier ......................... | 364/745 |
| 4,817,048 | 3/1989 | Rawlinson et al. ........... | 364/761 |
| 4,928,259 | 5/1990 | Galbi et al. .................. | 364/745 |
| 4,941,120 | 7/1990 | Brown et al. ................. | 364/748 |
| 5,293,558 | 3/1994 | Narita et al. ................. | 364/752 |

FOREIGN PATENT DOCUMENTS 0394499  10/1990  European Pat. Off.
9005335   5/1990  WIPO.

OTHER PUBLICATIONS

Proceedings IEEE ICCD:VLSI in Computers & Processors, Mass. 2–4 Oct. 1989, pp. 366–368; Lu et al.; "A VLSI Module for IEEE Floating Point Multiplication/Division/Square Root".

"New Scalar and Vector Elementary Functions for the IBM System/370", by Ramesch C. Agarwal et al; IMB J. Res. Develop. vol. 30, No. 2 Mar. 1986; pp. 126–144.

*Primary Examiner*—Envall, Jr. Roy N.
*Assistant Examiner*—Chuong D. Ngo
*Attorney, Agent, or Firm*—Lowe, Price, LeBlanc & Becker

[57] ABSTRACT

An approximate square root Ya of a given value X is derived by referring to a relation $Y=X^{\frac{1}{2}}$ at an accuracy at which an error between the approximate square root Ya and an infinitely precise square root Y is smaller than a weight of a digit in a digit place which is lower by two digit places than a least significant digit place for a final square root. The approximate square root Ya is rounded to an interim square root Yr equal to one of possible interim square roots which is closest to the approximate square root Ya. A value Xr is derived from the interim square root Yr using a relation $Xr=Yr2$. A sticky digit S is set to 0, 1, or −1 in response to a relation between the values X and Xr. The sticky digit S is added to a digit place having an order immediately lower than a lowest order digit place of the interim square root Yr, and a result of the addition is rounded in a designated rounding mode to obtain the final square root.

4 Claims, 8 Drawing Sheets

METHOD AND APPARATUS FOR PERFORMING FLOATING POINT ARITHMETIC OPERATION AND ROUNDING THE RESULT THEREOF

This application is a division of application Ser. No. 08/012,220, filed Feb. 2, 1993, now U.S. Pat. No. 5,313,415, which is a division of application Ser. No. 07/596,116, filed Oct. 11, 1990, now U.S. Pat. No. 5,212,661.

BACKGROUND OF THE INVENTION

This invention relates to a method and an apparatus for arithmetic processing.

Some arithmetic processing apparatuses use convergence-type arithmetic operations which can derive a solution of a functional equation at a high speed. For example, division and calculation of a square root can be performed by repeating additions and multiplications in accordance with Newton's method.

By using Newton's method, the division "Z=X/Y" can be performed as follows. A first approximate value $R_o$ of 1/Y is determined by referring to a table. Then, an approximate solution $R_n$ of 1/Y is calculated by repeatedly using the following recurrence formula "n" times.

$$R_i = R_{i-1}(2 - R_{i-1}Y) \quad (1)$$

Finally, an approximate value of X/Y can be obtained by multiplying $R_n$ and X.

In addition, by using Newton's method, the square root calculation "Y=$X^{\frac{1}{2}}$" can be performed as follows. A first approximate value $R_o$ of $1/X^{\frac{1}{2}}$ is determined by referring to a table. Then, an approximate solution $R_n$ of $1/X^{\frac{1}{2}}$ is calculated by repeatedly using the following recurrence formula "n" times.

$$R_i = (\tfrac{1}{2})R_{i-1}(3 - R_{i-1}^2 X) \quad (2)$$

Finally, an approximate value of $X^{\frac{1}{2}}$ can be obtained by multiplying $R_n$ and X.

In prior art methods of arithmetic operation, an approximate value having a necessary accuracy is calculated as mentioned previously, and a final result is obtained by directly rounding the approximate value to a predetermined number of significant digits in a designated rounding mode.

The rounding is of various types. For example, IEEE754 floating-point standards prescribe the following four rounding modes: "round to nearest", "round toward+infinity", "round toward−infinity", and "round toward zero".

Accurately rounding requires information representing good values of digits in places equal to and above the place immediately lower than the lowest place of significant digits, and also information representing whether or not values of digits in places equal to and below the place lower than the lowest place of the significant digits by two places are zero. In such arithmetic operation of deriving an approximate solution of a functional equation as mentioned previously, although a maximal error can be predicted by a calculation algorithm and a used hardware, an error between the approximate solution value and an infinitely precise value can not be known.

Therefore, cases related to the approximate solution value and the infinitely precise value respectively may be different from each other in information representing values of digits in places equal to and above the place immediately lower than the lowest place of significant digits and also representing whether or not values of digits in places equal to and below the place lower than the lowest place of the significant digits by two places are zero. This means that a result obtained by directly rounding an approximate solution value is sometimes different from a result obtained by rounding an infinitely precise value. As the accuracy of the approximate solution value is increased, there is a less possibility that the result obtained by rounding the approximate solution value is different from the result obtained by rounding the infinitely precise value. In general, increasing the accuracy of the approximate solution value needs a longer calculation time or a larger number of digits handled by a hardware.

SUMMARY OF THE INVENTION

It is an object of this invention to provide an improved method of arithmetic processing.

It is another object of this invention to provide an improved apparatus for arithmetic processing.

A first aspect of this invention provides a method comprising the steps of deriving an approximate solution Ya of a function F with respect to a given value X by referring to a relation Y=F(X) at an accuracy at which an error between the approximate solution Ya and an infinitely precise solution Y is smaller than a weight of a digit in a place lower than a lowest place of significant digits for a final solution by two places; rounding the approximate solution Ya to an interim solution Yr equal to one of possible interim solutions which is closest to the approximate solution Ya; the possible interim solutions being represented by digits in places, a lowest of which is arbitrarily selected from a place range starting from a place lower than the lowest place of the significant digits for the final solution by at least one place and ending at a place higher than a place of a minimal weight by at least one place, wherein a weight of a digit in the minimal-weight place is greater than a maximum of an error of the approximate solution Ya; deriving a value Xr from the interim solution Yr and an inverse function $F^{-1}$ by referring to a relation $Xr = F^{-1}(Yr)$; setting a sticky digit S to 0 when the values X and Xr are equal; deciding which of the infinitely precise solution Y and the interim solution Yr is greater by referring to a relation between the values X and Xr when the values X and Xr are different; setting the sticky digit S to −1 when the infinitely precise solution Y is decided to be smaller than the interim solution Yr; setting the sticky digit S to 1 when the infinitely precise solution Y is decided to be greater than the interim solution Yr; adding the sticky digit S to a place immediately lower than a lowest place of the interim solution Yr; and rounding a result of the adding in a designated rounding mode to obtain the final solution.

A second aspect of this invention provides a method of calculating a quotient Z=X/Y with respect to given values X and Y, comprising the steps of deriving an approximate quotient Za at an accuracy at which an error between the approximate quotient Za and an infinitely precise quotient Z is smaller than a weight of a digit in a place lower than a lowest place of significant digits for a final quotient by two places; rounding the approximate quotient Za to an interim quotient Zr equal to one of possible interim quotients which is closest to the approximate quotient Za, the possible interim quotients being represented by digits in places, a lowest of which is arbitrarily selected from a place range starting from a place lower than the lowest place of the significant digits for the final quotient by at least one place and ending at a place higher than a place of a minimal weight by at least one place, wherein a weight of a digit in the minimal-weight place is greater than a maximum of an error of the approximate quotient Za; deriving a product $Xr = Y \times Zr$ from the interim quotient Zr; setting a sticky digit S to one of 1, 0, and −1 in response to a relation in magnitude between the values X and Xr and to signs of the values X and Y; adding the sticky digit S to a place immediately lower than a lowest place of the interim quotient Zr; and rounding a result of the adding in a designated rounding mode to obtain the final quotient.

A third aspect of this invention provides a method of calculating a square root $Y = X^{\frac{1}{2}}$ with respect to a given positive value X, comprising the steps of deriving an approximate square root Ya at an accuracy at which an error between the approximate square root Ya and an infinitely precise square root Y is smaller than a weight of a digit in a place lower than a lowest place of significant digits for a final square root by two places; rounding the approximate square root Ya to an interim square root Yr equal to one of possible interim square roots which is closest to the approximate square root Ya, the possible interim square roots being represented by digits in places, a lowest of which is arbitrary selected from a place range starting from a place lower than the lowest place of the significant digits for the final square root by at least one place and ending at a place higher than a place of a minimal weight by at least one place, wherein a weight of a digit in the minimal-weight place is greater than a maximum of an error of the approximate square root Ya; deriving a square $Xr = Yr^2$ from the interim square root Yr; setting a sticky digit S to 0 when the values X and Xr are equal; setting the sticky digit S to −1 when the value X is smaller than the value Xr; setting the sticky digit S to 1 when the value X is greater than the value Xr; adding the sticky digit S to a place immediately lower than a lowest place of the interim square root Yr; and rounding a result of the adding in a designated rounding mode to obtain the final square root.

A fourth aspect of this invention provides an apparatus comprising means for deriving an approximate solution Ya of a function F with respect to a given value X by referring to a relation $Y = F(X)$ at an accuracy at which an error between the approximate solution Ya and an infinitely precise solution Y is smaller than a weight of a digit in a place lower than a lowest place of significant digits for a final solution by two places; means for rounding the approximate solution Ya to an interim solution Yr equal to one of possible interim solutions which is closest to the approximate solution Ya, the possible interim solutions being represented by digits in places, a lowest of which is arbitrarily selected from a place range starting from a place lower than the lowest place of the significant digits for the final solution by at least one place and ending at a place higher than a place of a minimal weight by at least one place, wherein a weight of a digit in the minimal-weight place is greater than a maximum of an error of the approximate solution Ya; means for deriving a value Xr from the interim solution Yr and an inverse function $F^{-1}$ by referring to a relation $Xr = F^{-1}(Yr)$; means for setting a sticky digit S to 0 when the values X and Xr are equal; means for deciding which of the infinitely precise solution Y and the interim solution Yr is greater by referring to a relation between the values X and Xr when the values X and Xr are different; means for setting the sticky digit S to −1 when the infinitely precise solution Y is decided to be smaller than the interim solution Yr; means for setting the sticky digit S to 1 when the infinitely precise solution Y is decided to be greater than the interim solution Yr; means for adding the sticky digit S to a place immediately lower than a lowest place of the interim solution Yr; and means for rounding a result of the adding in a designated rounding mode to obtain the final solution.

A fifth aspect of this invention provides an apparatus for calculating a quotient $Z = X/Y$ with respect to given values X and Y, comprising means for deriving an approximate quotient Za at an accuracy at which an error between the approximate quotient Za and an infinitely precise quotient Z is smaller than a weight of a digit in a place lower than a lowest place of significant digits for a final quotient by two places; means for rounding the approximate quotient Za to an interim quotient Zr equal to one of possible interim quotients which is closest to the approximate quotient Za, the possible interim quotients being represented by digits in places, a lowest of which is arbitrarily selected from a place range starting from a place lower than the lowest place of the significant digits for the final quotient by at least one place and ending at a place higher than a place of a minimal weight by at least one place, wherein a weight of a digit in the minimal-weight place is greater than a maximum of an error of the approximate quotient Za; means for deriving a product $Xr = Y \times Zr$ from the interim quotient Zr; means for setting a sticky digit S to one of 1, 0, and −1 in response to a relation in magnitude between the values X and Xr and to signs of the values X and Y; means for adding the sticky digit S to a place immediately lower than a lowest place of the interim quotient Zr; and means for rounding a result of the adding in a designated rounding mode to obtain the final quotient.

A sixth aspect of this invention provides an apparatus for calculating a square root $Y = X^{\frac{1}{2}}$ with respect to a given positive value X, comprising means for deriving an approximate square root Ya at an accuracy at which an error between the approximate square root Ya and an infinitely precise square root Y is smaller than a weight of a digit in a place lower than a lowest place of significant digits for a final square root by two places; means for rounding the approximate square root Ya to an interim square root Yr equal to one of possible interim square roots which is closest to the approximate square root Ya, the possible interim square roots being represented by digits in places, a lowest of which is arbitrarily selected from a place range starting from a place lower than the lowest place of the significant digits for the final square root by at least one place and ending at a place higher than a place of a minimal weight by at least one place, wherein a weight of a digit in the minimal-weight place is greater than a maximum of an error of the approximate square root Ya; means for deriving a square $Xr = Yr^2$ from the interim square root Yr; means for setting a sticky digit S to 0 when the values X and Xr are equal; means for setting the sticky digit S to −1 when the value X is smaller than the value Xr; means for setting the sticky digit S to 1 when the value X is greater than the value Xr; means for adding the sticky digit S to a place immediately lower than a lowest place of the interim square root Yr; and means for rounding a result of the adding in a designated rounding mode to obtain the final square root.

A seventh aspect of this invention provides an apparatus comprising means for generating a plurality of partial products from a given multiplicand and a given multiplier; means for generating a sign inversion value from at least a lower part of a subtrahend to enable place matching, the sign inversion value expressed in a format same as a format of expression of the partial products; and means for adding the partial products and the sign inversion value.

DESCRIPTION OF THE FIRST PREFERRED EMBODIMENT

Figure 1:
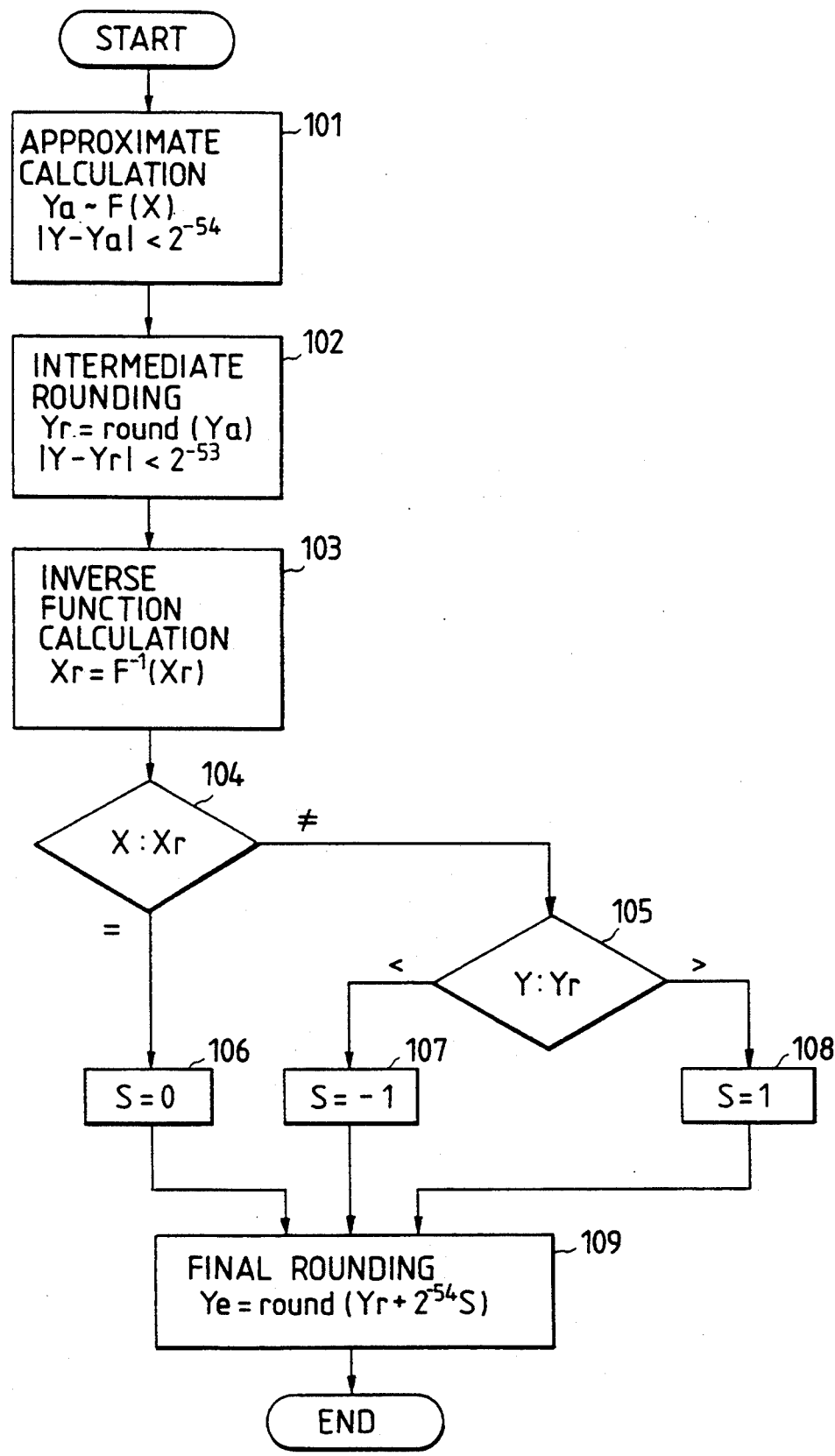
FIG. 1 is a flow chart of arithmetic processing according to a first embodiment of this invention.

With reference to FIG. 1, a first step 101 executes a process of calculating an approximate value. Specifically, the step 101 executes approximate calculation of a given function F(X) with respect to a given value X. An approximate solution of the function F(X) is calculated by a suitable way such as Newton's method. This calculation is realized by using multipliers and adders. In this calculation, the approximate solution is determined at an accuracy where the error between the approximate solution and the infinitely precise solution is smaller than the weight of the digit in a place which is lower than the lowest place of the required significant digits for a final result by two places. According to the double precision prescribed in IEEE754 standards, the number of significant digits of a mantissa part is 53, and the significant digit in the highest place has a weight of $2^0$ and the significant digit in the lowest place has a weight of $2^{-52}$. In this case, the error between the mantissa part Ya of the approximate solution and the mantissa part Y of the infinitely precise solution satisfies the following relation.

$$|Y-Ya|<2^{-54} \qquad (3)$$

Figure 2:
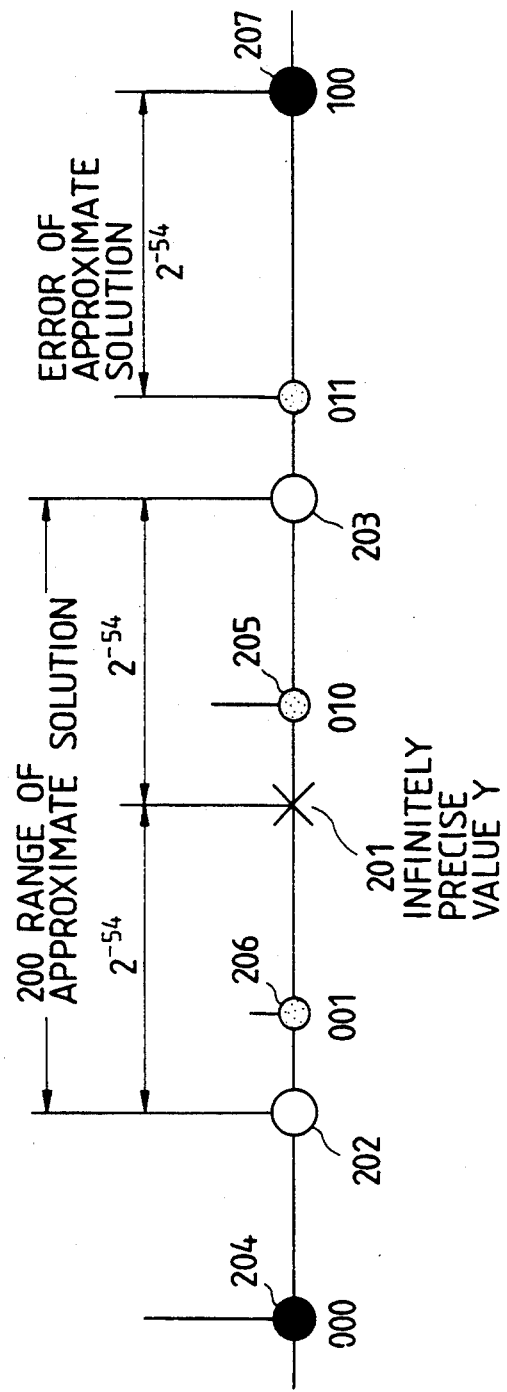
FIG. 2 is a diagram of a number line in the first embodiment.

FIG. 2 shows an example of a number line. In FIG. 2, sets of three digits, "000" to "100", denote the value of the lowest place of significant digits and the following lower places, wherein digits have the weights of $2^{-52}$, $2^{-53}$, $2^{-54}$, respectively. The scale points are spaced at equal intervals of $2^{-54}$. It is now assumed that the infinitely precise value (the infinitely precise solution) Y lies at a point 201. Since the infinitely precise value Y has an infinite accuracy and an infinite number of digits, the point 201 of the infinitely precise value Y is on the infinitesimal scale. The approximate solution Ya has a number of digits which is determined by the calculation algorithm and the used hardware. In general, one or more of the digits of the approximate solution Ya are located in places lower than the place corresponding to the maximal error, that is, the place having a weight of $2^{-54}$. The place having a weight of $2^{-54}$ is sometimes shortened to "the place of $2^{-54}$" or "the $2^{-54}$ place" in the following description. Other places are similarly shortened. It is known from the equation (3) that the approximate solution Ya lies in a region 200 of $2^{-53}$ which is defined between points 202 and 203.

Returning to FIG. 1, a step 102 rounds the approximate value Ya given by the step 101, and thereby calculates an interim solution Yr from the approximate value Ya. The interim solution Yr agrees with one of possible interim solutions which is closest to the approximate solution Ya, and each of the possible interim solutions can be represented by digits whose number is larger than the number of the significant digits and whose places are higher than the place corresponding to the minimal weight greater than the maximal error of the approximate solution Ya. In other words, the interim solution Yr is equal to one of possible interim solutions which is closest to the approximate solution Ya and the possible interim solutions are represented by digits in places, the lowest of which is arbitrarily selected from a place range starting from a place lower than the lowest place of the significant digits for the final solution by at least one place and ending at a place higher than a place of a minimal weight by at least one place, and a weight of digit in the minimal-weight place is greater than a maximum of an error of the approximate solution Ya.

In this regard, a description will be given by reference to FIG. 2. For example, in the case of an interim solution Yr having 54 digits whose number is greater than the number of the significant digits by one, the interim solution Yr agrees with a point 204 or a point 205. Specifically, when the approximate solution Ya lies between a point 202 and a point 206, the interim solution Yr agrees with the point 204. When the approximate solution Ya lies between a point 203 and a point 206, the interim solution Yr agrees with the point 205. Therefore, the error between the infinitely precise value Y and the interim solution Yr satisfies the following relation.

$$|Y-Yr|<2^{-53} \qquad (4)$$

Thus, the interim solution Yr is represented by digits in places, the lowest of which is lower than the lowest place of the significant digits by one place.

As shown in FIG. 1, a step 103 following the step 102 calculates an inverse function value Xr from the interim solution Yr. The inverse function value Xr is given as "Xr=F$^{-1}$(Yr)".

A step 104 following the step 103 compares the inverse function value Xr and the given value X. When the inverse function value Xr and the given value X are equal, the interim solution Yr equals the infinitely precise value Y. In this case, a step 106 is executed after the step 104. The step 106 sets a sticky digit S to 0. When the inverse function value Xr and the given value X are different, there is an error between the interim solution Yr and the infinitely precise value Y. In this case, a step 105 is executed after the step 104. The step 105 decides whether the error of the interim solution YR lies at a higher side or a lower side of the infinitely precise value Y.

The step 105 will be described in detail. The step 105 decides which of the infinitely precise value Y and the interim solution Yr is larger on the basis of the relation between the magnitudes of the given value X and the inverse function value Xr, and also on the basis of the characteristics of the function F. In the case where the given function I agrees with a monotonically increasing function or a monotonically decreasing function, the decision by the step 105 can be easily executed by referring to the relation between the magnitudes of the given value X and the inverse function value Xr. For example, in the case where the given function F agrees with a monotonically increasing function, the infinitely precise value Y is greater and smaller than the interim solution Yr when the given value X is greater and smaller than the inverse function value Xr respectively. When the result of the decision by the step 105 represents that the infinitely precise value Y is smaller than the interim solution Yr, a step 107 is executed next. The seep 107 sets the sticky digit S to $-1$. When the result of the decision by the step 105 represents that the infinitely precise value Y is greater than the interim solution Yr, a step 108 is executed next. The step 108 sets the sticky digit S to 1. In the example of FIG. 2, the sticky digit S is set to 1 and $-1$ when the interim solution Yr agrees with the point 204 and the point 205 respectively.

After the steps 106, 107, and 108, a final step 109 is executed. The step 109 adds the sticky digit S to a place immediately lower than the lowest place of the digits of the interim solution Yr, and thus performs the addition "$Yr+2^{-54}S$". The step 109 rounds the result of the addition to the significant digits in a designated rounding mode and thereby derives a final calculation result Ye. The data which represent the result of the addition have digits whose number is larger than the number of the significant digits by 2. In FIG. 2, the data are denoted by the point 206. As understood from FIG. 2, the point 206 and the infinitely precise value 201 (the infinitely precise value Y) lie between points 204 and 207 which are different only in the lowest-place significant digit by 1, and the point 206 and the infinitely precise value 201 (the infinitely precise value Y) lie at a common side of the middle point 205 between the points 204 and 207. Thus, the result of rounding the point 206 to the significant digits is equal to the result of rounding the infinitely precise value 201 (the infinitely precise value Y) to the significant digits.

Figure 3:
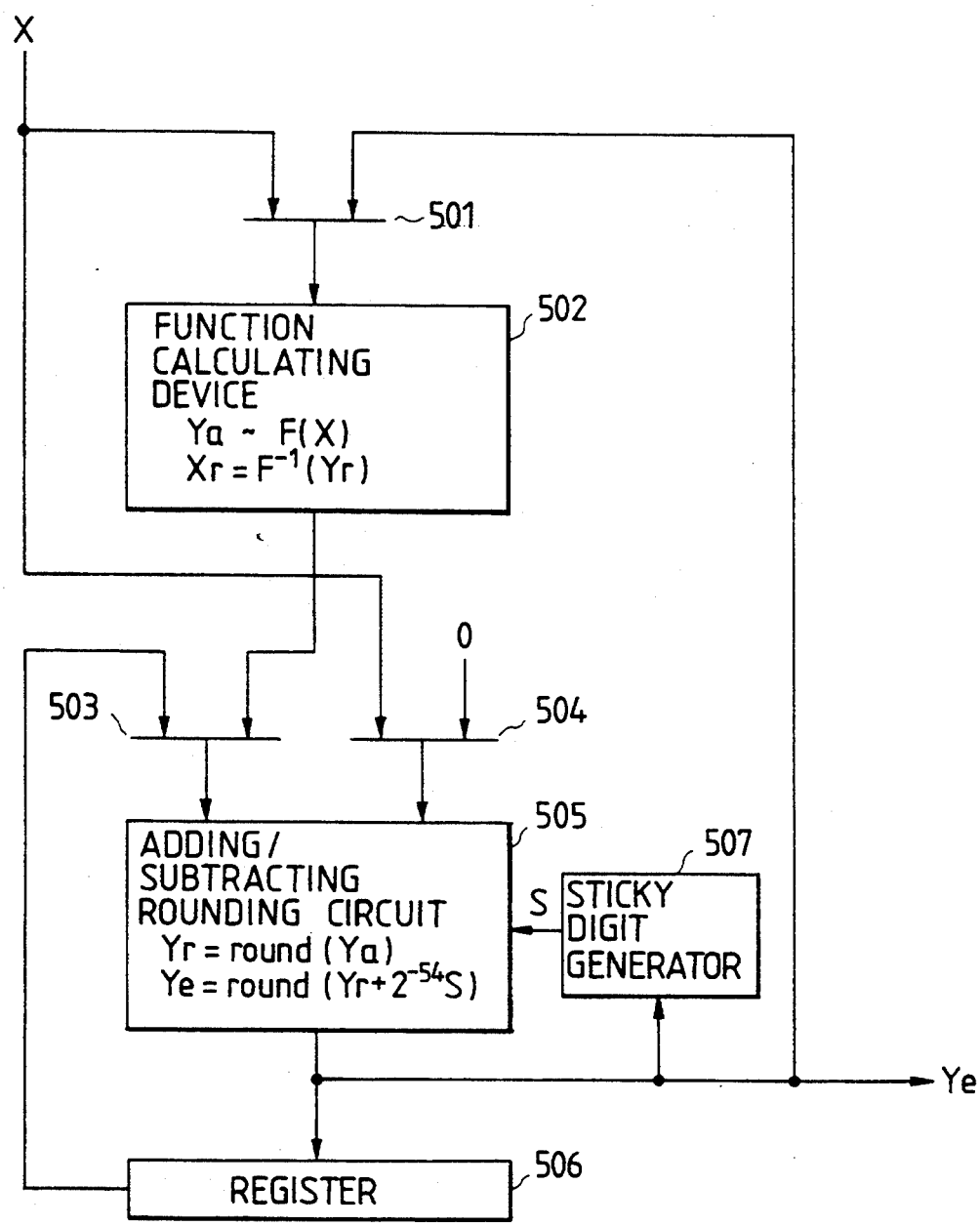
FIG. 3 is a block diagram of an apparatus for executing the arithmetic processing of FIG. 1.

FIG. 3 shows an apparatus for executing the arithmetic processing of FIG. 1. As shown in FIG. 3, the apparatus includes selectors 501, 503, and 504, a function calculating device 502, an adding/subtracting rounding circuit 505, a register 506, and a sticky digit generator 507. In general, these devices 501-507 are controlled by a controller (not shown).

Data of a given value X are selected by the selector 501 and are transmitted to the function calculating device 502. The function calculating device 502 executes approximate calculation of a function F with respect to the given value X, thereby calculating an approximate solution Ya. In this way, the operation of the step 101 of FIG. 1 is executed by the function calculating device 502.

Data of the approximate solution Ya are outputted from the function calculating device 502 to the selector 503. The data of the approximate solution Ya are selected by the selector 508, and are transmitted to the adding/subtracting rounding circuit 505. At the same time, data of "0" are selected by the selector 504, and are transmitted to the adding/subtracting rounding circuit 505. The adding/subtracting rounding circuit 505 rounds the approximate solution Ya to an interim solution Yr. In this way, the operation of the step 102 of FIG. 1 is executed by the adding/subtracting rounding circuit 505. The adding/subtracting rounding circuit 505 outputs data of the interim solution Yr which are stored into the register 506.

The data of the interim solution Yr are selected by the selector 501, and are transmitted to the function calculating device 502. The function calculating device 502 calculates an inverse function value "$Xr = F^{-1}(Yr)$" with respect to the interim solution Yr. In this way, the operation of the step 103 of FIG. 1 is executed by the function calculating device 502.

The function calculating device 502 outputs data of the inverse function value Xr to the selector 503. The data of the inverse function value Xr are selected by the selector 503, and are transmitted to the adding/subtracting rounding circuit 505. At the same time, the data of the given value X are selected by the selector 504, and are transmitted to the adding/subtracting rounding circuit 505. The adding/subtracting rounding circuit 505 includes a subtracter which subtracts the given value X from the inverse function value Xr and thus which derives a difference equal to "$Xr-X$". Data of the difference "$Xr-X$" are outputted from the adding-/subtracting rounding circuit 505 to the sticky digit generator 507. In the case where the difference "$Xr-X$" is 0, the sticky digit generator 507 outputs data representing a sticky digit S equal to 0. In the case where the difference "$Xr-X$" differs from 0, the sticky digit generator 507 executes a decision as to which of the infinitely precise solution Y and the interim solution Yr is greater on the basis of the characteristics of the function F and the information of the sign of the difference "$Xr-X$". When the infinitely precise solution Y is smaller than the interim solution Yr, the sticky digit generator 507 outputs data representing the sticky digit S equal to $-1$. When the infinitely precise solution Y is greater than the interim solution Yr, the sticky digit generator 507 outputs data representing the sticky digit S equal to 1. In this way, the operations of the steps 104–108 of FIG. 1 are executed by the adding/subtracting rounding circuit 505 and the sticky digit generator 507.

The data of the sticky digit S are fed from the sticky digit generator 507 to the adding/subtracting rounding circuit 505. At the same time, the data of the interim solution Yr which are outputted from the register 506 are selected by the selector 503, and are transmitted to the adding/subtracting rounding circuit 505. The adding/subtracting rounding circuit 505 includes an adder which adds the sticky digit S to the place immediately lower than the lowest place of the digits of the interim solution Yr. The adding/subtracting rounding circuit 505 rounds the result of this addition in a designated rounding mode to obtain a final solution Ye. In this way, the operation of the step 109 of FIG. 1 is executed by the adding/subtracting rounding circuit 505. Data (a digital signal) of the final solution Ye are transmitted from the adding/subtracting rounding circuit 505 to an external circuit (not shown) and are used therein.

DESCRIPTION OF THE SECOND PREFERRED EMBODIMENT

A second embodiment of this invention relates to division and uses IEEE754 standards. A description will be given of a normalized mantissa part. A mantissa part has 53 significant digits, and the significant digit in the highest place has a weight of $2^0$ and the significant digit in the lowest place has a weight of $2^{-52}$. When both of a dividend X and a divisor Y are positive, the numbers X and Y satisfy the relation "$1 \leq X, Y < 2$".

Figure 4:
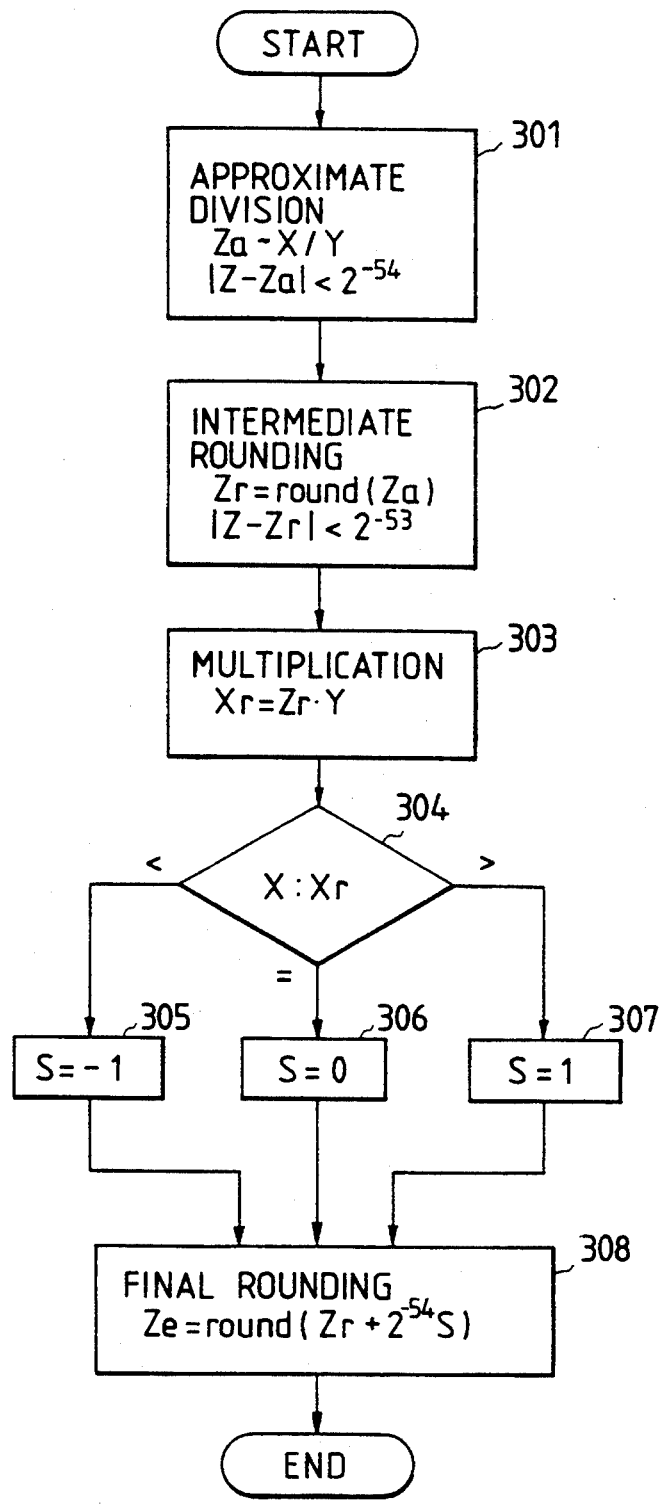
FIG. 4 is a flow chart of arithmetic processing according to a second embodiment of this invention.

With reference to FIG. 4, a first step 301 calculates an approximate quotient Za of division of X/Y in a suitable way such as Newton's method. The step 301 corresponds to the step 101 of FIG. 1. It is now assumed that the dividend X is not smaller than the divisor Y. In this case, the infinitely precise quotient Z which equals X/Y satisfies the relation "$1 \leq Z < 2$". The accuracy of the approximate quotient Za is defined by the error between the approximate quotient Za and the infinitely precise quotient Z. The error between the approximate quotient Za and the infinitely precise quotient Z is smaller than the weight of the digit in a place which is lower than the lowest place of the required significant digits for a final result by two places. According to the double precision prescribed in IEEE754 standards, since the digit in the lowest place has a weight of $2^{-52}$, the error between the approximate quotient Za and the infinitely precise quotient Z satisfies the following relation.

$$|Z-Za| < 2^{-54} \tag{5}$$

A step 302 following the step 301 executes rounding similar to the rounding executed by the step 102 of FIG. 1. Specifically, the step 302 rounds the approximate quotient Za given by the step 301, and thereby calculates an interim quotient Zr from the approximate quotient Za. The interim quotient Zr agrees with one of possible interim quotients which is closest to the approximate quotient Za, and each of the possible interim quotients can be represented by digits whose number is larger than the number of the significant digits and whose places are higher than the place corresponding to the minimal weight greater than the maximal error of the approximate quotient Za. In other words, the interim quotient Zr is equal to one of possible interim quotients which is closest to the approximate quotient Za and the possible interim quotients are represented by digits in places, the lowest of which is arbitrarily selected from a place range starting from a place lower than the lowest place of the significant digits for the final quotient by at least one place and ending at a place higher than a place of a minimal weight by at least one place, and a weight of digit in the minimal-weight place is greater than a maximum of an error of the approximate quotient Za. For example, in the case of an interim quotient Zr having 54 digits whose number is greater than the number of the significant digits by one, the error between the infinitely precise quotient Z and the interim quotient Zr satisfies the following relation.

$$|Z-Zr| < 2^{-53} \tag{6}$$

Thus, the interim quotient Zr is represented by digits in places, the lowest of which is lower than the lowest place of the significant digits by one place.

A step 303 following the step 302 corresponds to the step 103 of FIG. 1. Specifically, the step 303 calculates an inverse function value Xr with respect to the function "Z=X/Y" on the basis of the interim quotient Zr. The inverse function value Xr agrees with the product "$Xr = Zr \times Y$".

A step 304 following the step 303 corresponds to the steps 104 and 105 of FIG. 1. Specifically, the step 304 compares the product Xr and the given value X to decide whether the error of the interim quotient Zr lies at the lower side or the higher side of the infinitely precise quotient Z. Since both of the given values X and Y are positive and thus the infinitely precise quotient Z corresponds to a monotonically increasing function of the given value X in the division "X/Y", a sticky digit S can be determined only by the comparison between the given value X and the product Xr. When the given value X is smaller than the product Xr, that is, when the infinitely precise quotient Z is smaller than the interim quotient Zr, the step 304 is followed by a step 305 which sets the sticky digit S to $-1$. When the given value X and the product Xr are equal, that is, when the infinitely precise quotient Z and the interim quotient Zr are equal, the step 304 is followed by a step 306 which sets the sticky digit S to 0. When the given value X is greater than the produce Xr, that is, when the infinitely precise quotient Z is greater than the interim quotient Zr, the step 304 is followed by a step 307 which sets the sticky digit S to 1.

After the steps 305, 306, and 307, a final step 308 is executed. The step 308 executes rounding similar to the rounding executed by the step 109 of FIG. 1. Specifically, the step 308 adds the sticky digit S to a place immediately lower than the lowest place of the digits of the interim quotient Zr, and thus performs the addition "$Zr + 2^{-54}S$". The step 308 rounds the result of the addition to the significant digits in a designated rounding mode and thereby derives a final calculation result Ze. The final result Ze is equal to the result of rounding the infinitely precise quotient Z.

A description will be given of the case where the dividend X is smaller than the divisor Y. The calculations and decisions executed in this case are similar to those executed in the case where the dividend X is not smaller than the divisor Y except for the following points. In the case where the dividend X is smaller than the divisor Y, the infinitely precise quotient Z which equals X/Y satisfies the relation "$1/2 < Z < 1$". In this case, the digit in the $2^0$ place of the infinitely precise quotient Z is 0, and the lowest-place digit of the final quotient Ze is located at the $2^{-53}$ place which is lower by one place than that occurring in the case where the dividend X is not smaller than the divisor Y. Therefore, the error between the approximate quotient Za and the infinitely precise quotient Z satisfies the following relation.

$$|Z-Za| < 2^{-55} \tag{7}$$

The interim quotient Zr requires 55 digits or more in places equal to and above the $2^{-54}$ place. Accordingly, the interim quotient Zr is calculated so that the following relation can be satisfied.

$$|Z-Zr| < 2^{-54} \tag{8}$$

In addition, the step 308 rounds the result of the addition to the significant digits in the places equal to and above the $2^{-53}$ place.

This embodiment may be modified as follows. In the case where the dividend X is not smaller than the divisor Y, the interim quotient Zr may be calculated at an accuracy higher by one digit so that the equation (8) can be satisfied.

Figure 5:
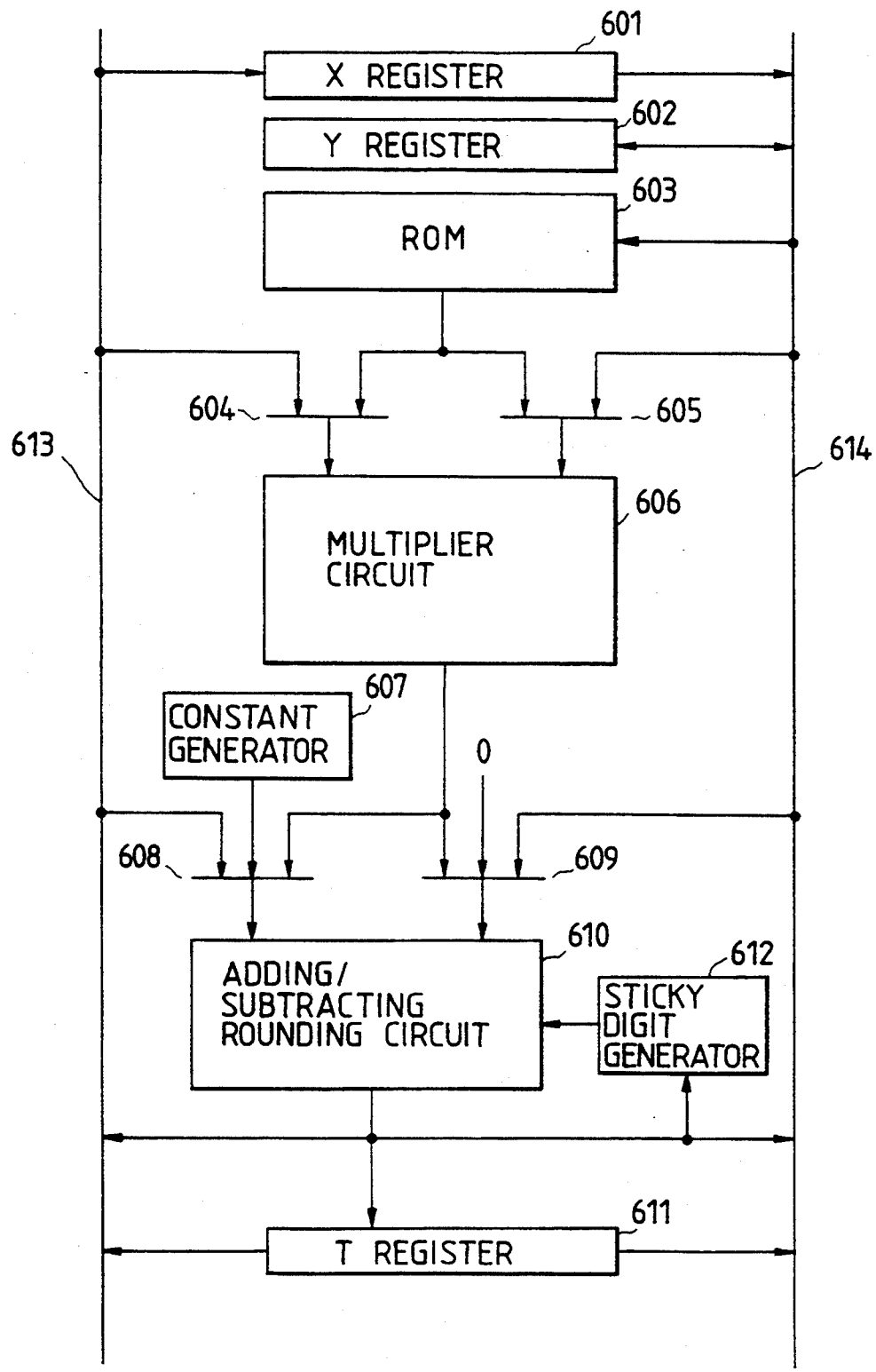
FIG. 5 is a block diagram of an apparatus for executing the arithmetic processing of FIG. 4.

FIG. 5 shows an apparatus for executing the arithmetic processing of FIG. 4. As shown in FIG. 5, the apparatus includes an X register 601, a Y register 602, a T register 611, a ROM 603, selectors 604, 605, 608, and 609, a multiplier circuit 606, a constant generator 607, an adding/subtracting rounding circuit 610, a sticky digit generator 612, and data buses 613 and 614. In general, the devices 601–612 are controlled by a controller (not shown).

Data of a dividend X are stored into the X register 601 via the data bus 613. Data of a divisor Y are stored into the Y register 602 via the data bus 614. Then, approximate division for calculating an approximate quotient Za is started. In this approximate division, multiplication, addition, and subtraction are reiterated to derive the approximate quotient Za. By using Newton's method, the division "$Z=X/Y$" can be performed as follows. A first approximate value $R_o$ of $1/Y$ is determined by referring to a table. Then, an approximate solution $R_n$ of $1/Y$ is calculated by repeatedly using the previously-mentioned recurrence formula (1) "n" times. Finally, an approximate value of $X/Y$ can be obtained by multiplying $R_n$ and X.

The calculation of the approximate quotient Za is executed in the following sequence.

1) The data of the divisor Y are fed from the Y register 602 to the RAM 603 via the data bus 614, and data of an approximate value $R_o$ of $1/Y$ are outputted from the to the selectors 604 and 605.

2) The data of the approximate value $R_o$ are selected by the selector 604, and are transmitted to the multiplier circuit 606. At the same time, the data of the divisor Y are transmitted from the Y register 602 to the multiplier circuit 606 via the data bus 614 and the selector 605. The multiplier circuit 606 calculates the product "$R_o \cdot Y$". The multiplier circuit 606 outputs data of the product "$R_o \cdot Y$" to the selector 609.

3) The selector 608 selects data of the value "2" which are generated by the constant generator 607, and the selected data are transmitted to the adding/subtracting rounding circuit 610. The data of the product "$R_o \cdot Y$" are selected by the selector 609, and are transmitted to the adding/subtracting rounding circuit 610. The adding/subtracting rounding circuit 610 includes a subtracter which subtracts the product "$R_o \cdot Y$" from the value "2" and thus which calculates the value "$2-R_o \cdot Y$". The adding/subtracting rounding circuit 610 rounds the calculated value "$2-R_o \cdot Y$". The adding/subtracting rounding circuit 610 outputs data of the rounded value "$2-R_o \cdot Y$" to the selector 604 via the data bus 613.

4) The data of the rounded value "$2-R_o \cdot Y$" are selected by the selector 604, and are transmitted to the multiplier circuit 606. At the same time, the data of the approximate value $R_o$ are selected by the selector 605, and are transmitted to the multiplier circuit 606. The multiplier circuit 606 calculates the product "$R_o(2-R_o \cdot Y)$". The multiplier circuit 606 outputs data of the product "$R_o(2-R_o \cdot Y)$" to the selector 608.

5) The data of the product "$R_o(2-R_o \cdot Y)$" are selected by the selector 608, and are transmitted to the adding/subtracting rounding circuit 610. At the same time, data of "0" are selected by the selector 609, and are transmitted to the adding/subtracting rounding circuit 610. The adding/subtracting rounding circuit 610 rounds the product "$R_o(2-R_o \cdot Y)$" to a value $R_1$. The adding/subtracting rounding circuit 610 outputs data of the value $R_1$ which are stored into the T register 611.

6) The value $R_1$ is used in place of the value $R_o$, and the previously-mentioned processings 2)-5) are executed to obtain a next value $R_2$. Such operation is reiterated to derive an adequately-accurate value $R_n$.

7) The adding/subtracting rounding circuit 610 outputs data of the value $R_n$ which are transmitted to the multiplier circuit 606 via the data bus 613 and the selector 604. At the same time, the data of the dividend X are transmitted from the X register 601 to the multiplier circuit 606 via the data bus 614 and the selector 605. The multiplier circuit 606 calculates the product of the values $R_n$ and X, that is, the approximate quotient "$Za=R_n \cdot X$" for an infinitely precise quotient $X/Y$. The multiplier circuit 606 outputs data of the approximate quotient Za to the selector 608.

In this way, the operation of the step 301 of FIG. 5 is executed by the devices 601–611. After the approximate quotient Za is calculated, the apparatus of FIG. 5 operates as follows.

The data of the approximate quotient Za are selected by the selector 608, and are transmitted to the adding/subtracting rounding circuit 610. At the same time, the data of "0" are selected by the selector 609, and are transmitted to the adding/subtracting rounding circuit 610. The adding/subtracting rounding circuit 610 rounds the approximate quotient Za to an interim quotient Zr. The adding/subtracting rounding circuit 610 outputs data of the interim quotient Zr which are stored into the T register 611. In this way, the operation of the step 302 of FIG. 4 is executed by the adding/subtracting rounding circuit 610.

The data of the interim quotient Zr are transmitted to the multiplier circuit 606 via the data bus 613 and the selector 604. At the same time, the data of the divisor Y are transmitted to the multiplier circuit 606 via the data bus 614 and the selector 605. The multiplier circuit 606 calculates an inverse function value Xr with respect to the interim quotient Zr, that is, calculates the product "$Xr=Zr \cdot Y$" of the values Zr and Y. The multiplier circuit 606 outputs data of the product Xr to the selector 608. In this way, the operation of the step 303 of FIG. 4 is executed by the multiplier circuit 606.

The data of the product Xr are selected by the selector 608, and are transmitted to the adding/subtracting rounding circuit 610. At the same time, the data of the dividend X are transmitted from the X register 601 to the adding/subtracting rounding circuit 610 via the data bus 614 and the selector 609. The adding/subtracting rounding circuit 610 includes a subtracter which subtracts the dividend X from the product Xr and thus which derives a difference equal to "$Xr-X$". Data of the difference "$Xr-X$" are outputted from the adding/subtracting rounding circuit 610 to the sticky digit generator 612. In the case where the difference "$Xr-X$" is 0, the sticky digit generator 612 outputs data representing a sticky digit S equal to 0. In the case where the difference "$Xr-X$" is negative, the sticky digit generator 612 outputs data representing the sticky digit S equal to 1. In the case where the difference "$Xr-X$" is positive, the sticky digit generator 612 outputs data representing the sticky digit S equal to $-1$. In this way, the operations of the seeps 304–307 of FIG. 4 are executed by the adding/subtracting rounding circuit 610 and the sticky digit generator 612.

The data of the sticky digit S are fed from the sticky digit generator 612 to the adding/subtracting rounding circuit 610. At the same time, the data of the interim quotient Zr which are outputted from the T register 611 are selected by the selector 608, and are transmitted to the adding/subtracting rounding circuit 610. The adding/subtracting rounding circuit 610 includes an adder which adds the sticky digit S to the place immediately lower than the lowest place of the digits of the interim quotient Zr. The adding/subtracting rounding circuit 610 rounds the result of this addition in a designated rounding mode to obtain a final quotient Ze. In this way, the operation of the step 308 of FIG. 4 is executed by the adding/subtracting rounding circuit 610. Data (a digital signal) of the final quotient Ze are transmitted from the adding/subtracting rounding circuit 610 to an external circuit (not shown), and are used therein.

While the dividend X and the divisor Y are positive in the previously-mentioned description, division in other cases is executed similarly except for the following points. Specifically, in the case where the signs of the dividend X and the quotient Z are equal, the sticky digit S is set to 0 when the product Xr and the dividend X are equal and the sticky digit S is set to −1 and 1 when the value Xr is greater and smaller than the value X respectively. In the case where the signs of the dividend X and the quotient Z are different, the sticky digit S is set to 0 when the product Xr and the dividend X are equal and the sticky digit S is set to 1 and −1 when the value Xr is greater and smaller than the value X respectively.

DESCRIPTION OF THE THIRD PREFERRED EMBODIMENT

A third embodiment of this invention relates to calculation of a square root and uses IEEE754 standards. A description will be given of a normalized mantissa part. A mantissa part has 53 significant digits, and the significant digit in the highest place has a weight of $2^0$ and the significant digit in the lowest place has a weight of $2^{-52}$. In the case of a floating point data whose exponent equals an even number, it is sufficient to consider a given value X in the range "$1 \leq X < 2$". In the case of a floating point data whose exponent equals an odd number, its mantissa part should be shifted leftward by one place and the square root of the resultant mantissa part should be calculated, and thus it is necessary to consider a given value X in the range "$2 \leq X < 4$". Accordingly, when similar processing is done independent of whether the exponent is even or odd, it is sufficient to consider a given value X "$1 \leq X < 4$". Thus, the square root Y of the given value X is in the range "$1 \leq Y < 2$".

Figure 6:
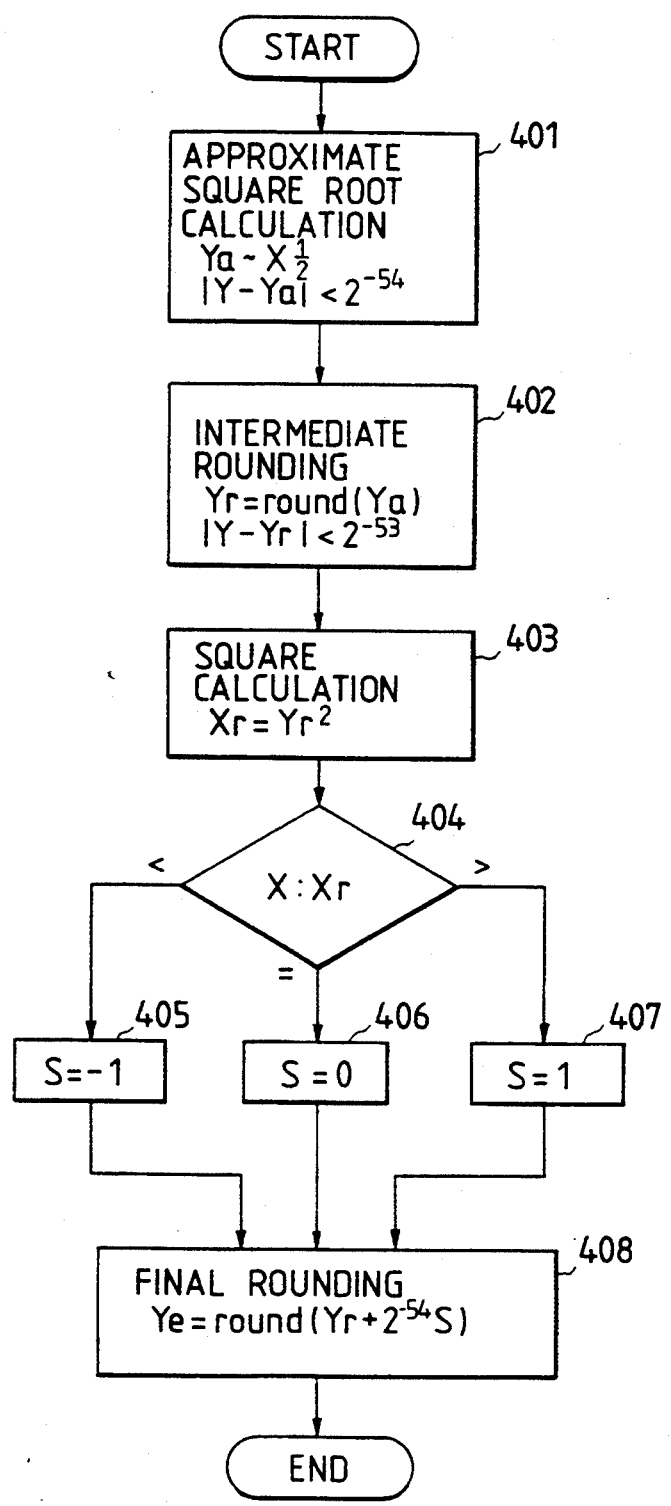
FIG. 6 is a flow chart of arithmetic processing according to a third embodiment of this invention.

With reference to FIG. 6, a first step 401 calculates an approximate square root Ya of a given value X in a suitable way such as Newton's method. The step 401 corresponds to the step 101 of FIG. 1. The accuracy of the approximate square root Ya is defined by the error between the approximate square root Ya and the infinitely precise square root Y ($Y = X^{\frac{1}{2}}$). The error between the approximate square root Ya and the infinitely precise square root Y is smaller than the weight of the digit in a place which is lower than the lowest place of the required significant digits for a final result in two places. According to the double precision prescribed in IEEE 754 standards, since the significant digit in the lowest place has a weight of $2^{-52}$, the error between the approximate square root Ya and the infinitely precise square root Y satisfies the following relation.

$$|Y - Ya| < 2^{-54} \tag{9}$$

A step 402 following the step 401 executes rounding similar to the rounding executed by the step 102 of FIG. 1. Specifically, the step 402 rounds the approximate square root Ya given by the step 301, and thereby calculates an interim square root Yr from the approximate square root Ya. The interim square root Yr agrees with one of possible interim square roots which is closest to the approximate square root Ya, and each of the possible interim square roots can be represented by digits whose number is larger than the number of the significant digits and whose places are higher than the place corresponding to the minimal weight greater than the maximal error of the approximate square root Ya. In other words, the interim square root Yr is equal to one of possible interim square roots which is closest to the approximate square root Ya and the possible interim square roots are represented by digits in places, the lowest of which is arbitrarily selected from a place range starting from a place lower than the lowest place of the significant digits for the final square root by at least one place and ending at a place higher than a place of a minimal weight by at least one place, and a weight of digit in the minimal-weight place is greater than a maximum of an error of the approximate square root Ya. For example, in the case of an interim square root Yr having 54 digits whose number is greater than the number of the significant digits by one, the error between the infinitely precise square root Y and the interim square root Yr satisfies the following relation.

$$|Y - Yr| < 2^{-53} \tag{10}$$

Thus, the interim square root Yr is represented by digits in places, the lowest of which is lower than the lowest place of the significant digits by one place.

A step 403 following the step 402 corresponds to the step 103 of FIG. 1. Specifically, the step 403 executes multiplication and thereby calculates an inverse function value Xr with respect to the function "$Y = X^{\frac{1}{2}}$" on the basis of interim square root Yr. The inverse function value Xr agrees with the square "$Xr = Yr^2$".

A step 404 following the step 403 corresponds to the steps 104 and 105 of FIG. 1. Specifically, the step 404 compares the square Xr and the given value X to decide whether the error of the interim square root Yr lies at lower side or the higher side of the infinitely precise square root Y. Since the infinitely precise square root Y corresponds to a monotonically increasing function of the given value X in the square root "$Y = X^{\frac{1}{2}}$", a sticky digit S can be determined only by the comparison between the given value X and the square Xr. When the given value X is smaller than the square Xr, that is, when the infinitely precise square root Y is smaller than the interim square root Yr, the step 404 is followed by a step 405 which sets the sticky digit S to −1. When the given value X and the square Xr are equal, that is, when the infinitely precise square root Y and the interim square root Y are equal, the step 404 is followed by a step 406 which sets the sticky digit S to 0. When the given value X is greater than the square Xr, that is, when the infinitely precise square root Y is greater than the interim square root Yr, the step 404 is followed by a step 407 which sets the sticky digit S to 1.

After the steps 405, 406, and 407, a final step 408 is executed. The step 408 executes rounding similar to the rounding executed by the step 109 of FIG. 1. Specifically, the step 408 adds the sticky digit S to a place immediately lower than the lowest place of the digits of the interim square root Yr, and thus performs the addition "Yr+2$^{-54}$S". The step 408 rounds the result of the addition to the significant digits in a designated rounding mode and thereby derives a final calculation result Ye. The final result Ye is equal to the result of rounding the infinitely precise square root Y.

An apparatus for executing the arithmetic processing of FIG. 6 is similar to the apparatus of FIG. 5. The apparatus operates as follows.

Data of a given value X are stored into the X register 601 via the data bus 613. Then, approximate square root calculation for calculating an approximate square root Ya is started. In this approximate square root calculation, multiplication, addition, and subtraction are reiterated to derive the approximate square root Ya as in the embodiment of FIGS. 4 and 5. By using Newton's method. square root calculation "Y=X$^{\frac{1}{2}}$" can be performed as follows. A first approximate value R$_0$ of 1/X$^{\frac{1}{2}}$" is determined by referring to a table. Then, an approximate solution R$_n$ of 1/X$^{\frac{1}{2}}$ is calculated by repeatedly using the previously mentioned formula (2) "n" times. Finally, an approximate value of X$^{\frac{1}{2}}$ can be obtained by multiplying R$_n$ and X. The multiplier circuit 606 outputs data of the approximate square root Ya to the selector 608.

The data of the approximate square root Ya are selected by the selector 608, and are transmitted to the adding/subtracting rounding circuit 610. At the same time, the data of "0" are selected by the selector 609, and are transmitted to the adding/subtracting rounding circuit 610. The adding/subtracting rounding circuit 610 rounds the approximate square root Ya to an interim square root Yr. The adding/subtracting rounding circuit 610 outputs data of the interim square root Yr which are stored into the T register 611. In this way, the operation of the step 402 of FIG. 6 is executed by the adding/subtracting rounding circuit 610.

The data of the interim square root Yr are transmitted to the multiplier circuit 606 via both of the selectors 604 and 605. The multiplier circuit 606 calculates an inverse function value Xr with respect to the interim square root Yr, that is, calculates the square "Xr=Yr$^2$" of the interim square root Yr. The multiplier circuit 606 outputs data of the square Xr to the selector 608. In this way, the operation of the step 403 of FIG. 6 is executed by the multiplier circuit 606.

The data of the square Xr are selected by the selector 608, and are transmitted to the adding/subtracting rounding circuit 610. At the same time, the data of the given value X are transmitted from the X register 601 to the adding/subtracting rounding circuit 610 via the data bus 614 and the selector 609. The adding/subtracting rounding circuit 610 includes a subtracter which subtracts the given value X from the square Xr and thus which derives a difference equal to "Xr−X". Data of the difference "Xr−X" are outputted from the adding/subtracting rounding circuit 610 to the sticky digit generator 612. In the case where the difference "Xr−X" is 0, the sticky digit generator 612 outputs data representing a sticky digit S equal to 0. In the case where the difference "Xr−X" is negative, the sticky digit generator 612 outputs data representing the sticky digit S equal to 1. In the case where the difference "Xr−X" is positive, the sticky digit generator 612 outputs data representing the sticky digit S equal to −1. In this way, the operations of the steps 404–407 of FIG. 6 are executed by the adding/subtracting rounding circuit 610 and the sticky digit generator 612.

The data of the sticky digit S are fed from the sticky digit generator 612 to the adding/subtracting rounding circuit 610. At the same time, the data of the interim square root Yr which are outputted from the T register 611 are selected by the selector 608, and are transmitted to the adding/subtracting rounding circuit 610. The adding/subtracting rounding circuit 610 includes an adder which adds the sticky digit S to the place immediately lower than the lowest place of the digits of the interim square root Yr. The adding/subtracting rounding circuit 610 rounds the result of this addition in a designated rounding mode to obtain a final square root Ye. In this way, the operation of the step 408 of FIG. 4 is executed by the adding/subtracting rounding circuit 610. Data (a digital signal) of the final square root Ye are transmitted from the adding/subtracting rounding circuit 610 to an external circuit (not shown), and are used therein.

DESCRIPTION OF THE FOURTH PREFERRED EMBODIMENT

A fourth embodiment of this invention is similar to the embodiment of FIGS. 4 and 5 except for a design indicated hereinafter. The fourth embodiment relates to division and uses IEEE754 standards. A description will be given of a normalized mantissa part. A mantissa part has 53 significant digits, and the significant digit in the highest place has a weight of $2^0$ and the significant digit in the lowest place has a weight of $2^{-52}$. When both of a dividend X and a divisor Y are positive, the numbers X and Y satisfy the relation "$1 \leq X, Y < 2$".

As in the embodiment of FIGS. 4 and 5, an approximate quotient Za of division of X/Y is calculated, and then an interim quotient Zr is calculated by rounding the approximate quotient Za. The error δ between the interim quotient Zr and the infinitely precise quotient Z is given by the following equation.

$$\delta = Zr - Z \quad (11)$$

An inverse function value Xr with respect to the function "Z=X/Y" is calculated on the basis of the interim quotient Zr. The inverse function value Xr agrees with the product "Xr=Zr×Y" which is expressed by the following equation.

$$\begin{aligned} Xr &= Zr \times Y \\ &= (Z + \delta) \times Y \\ &= X + \delta \cdot Y \\ &= X + \Delta \end{aligned} \quad (12)$$

where Δ denotes δ·Y. It is known from the equation (12) that the product Xr is greater than the given value X by the value Δ or δ·Y. When the absolute value of the error δ of the interim quotient Zr is smaller than $2^{-54}$, the maximum of the absolute value of the value Δ or δ·Y satisfies the following condition.

$$\begin{aligned} |\Delta|max &= |\delta \cdot Y|max \\ &< 2^{-54} \cdot 2 \\ &< 2^{-53} \end{aligned} \quad (13)$$

The relation (13) reveals that the digits in places equal to and above the place having a weight of $2^{-53}$ are always 0 when the absolute value of the value Δ is represented by binary number. Since a normalized mantissa part is now assumed, the digits of the dividend X in places equal to and below the place having a weight of $2^{-53}$ are always 0.

Therefore, in the case where the value $\Delta$ is positive, the digits of the produce XR in the $2^0$ place to the $2^{-52}$ place are equal to the digits of the dividend X respectively, and the digit of the product Xr in the $2^{-53}$ place is 0 and the digits of the produce Xr in the lower places are equal to the digits of the value $\Delta$ respectively. In the case where the value $\Delta$ is 0, the digits of the product Xr in the $2^0$ place to the $2^{-52}$ place are equal to the digits of the dividend X respectively, and the digits of the produce Xr in the lower places are 0. In the case where the value $\Delta$ is negative, the digits of the product Xr are equal to the dividend X minus the absolute value of the value $\Delta$. Accordingly, in the case where the value $\Delta$ is negative, the digits of the product Xr in the $2^0$ place to the $2^{-52}$ place are equal to the digits of the value which is smaller than the dividend X by $2^{-52}$ respectively, and the digit of the product Xr in the $2^{-53}$ place is 1 and the digits of the product Xr in the lower places are equal to the digits of the complement of the value $\Delta$ with respect to 2 respectively. As understood from the above description, it is possible to decide whether the value $\Delta$ is positive, negative, or 0 by examining the digits of the product Xr in the places equal to and below the place having a weight of $2^{-53}$.

Therefore, it is possible to decide which of the interim quotient Zr and the infinitely precise quotient Z is greater by referring to the relations (11) and (12). The sticky digit S can be determined on the basis of result of this decision. Specifically, in the case where the digit of the product Xr in the $2^{-53}$ place is 0 and at least one of the digits of the product Xr in the $2^{-54}$ place and the lower places is different from 0, the value $\Delta$ is positive and the interim quotient Zr is greater than the infinitely precise quotient Z, and thus it is good to set the sticky digit S to $-1$. In the case where all the digits of the product Xr in the $2^{-53}$ place and the lower places are 0, the value $\Delta$ is 0 and the interim quotient Zr is equal to the infinitely precise quotient Z, and thus it is good to set the sticky digit S to 0. In the case where the digit of the product Xr in the $2^{-53}$ place is 1. the value $\Delta$ is negative and the interim quotient Zr is smaller than the infinitely precise quotient Z, and thus it is good to set the sticky digit S to 1.

As described previously, the decision as to which of the interim quotient Zr and the infinitely precise quotient Z is greater can be easily done by examining the digits of the product Xr in the $2^{-53}$ place and the lower places without performing the subtraction between the product Xr and the dividend X. In addition, the sticky digit S can be determined on the basis of the result of this decision.

This simple way of determining the sticky digit S can be used in calculations other than division by performing the following settings. An approximate solution Ya of the function "Y=F(X)", and an interim solution Yr calculated by rounding the approximate solution Ya are determined so that the maximum of the absolute value of the difference between the given value X and the inverse function value "Xr=F$^{-1}$(Yr)" will be smaller than the weight of the place lower than the lowest place of the significant digits of the given value X by one place.

DESCRIPTION OF THE FIFTH PREFERRED EMBODIMENT

A fifth embodiment of this invention is similar to the embodiment of FIG. 6 except for a design indicated hereinafter. A consideration will be given or the case where the maximum of the absolute value of the difference between a given value X and an inverse function value "Xr=F$^{-1}$(Yr)" calculated from an interim solution Yr is greater than the weight of the place lower than the lowest place of the significant digits of the given value X by one place.

As in the embodiment of FIG. 6, an approximate square root Ya is calculated, and an interim square root Yr is calculated by rounding the approximate square root Ya. The error $\delta$ between the interim square root Yr and the infinitely precise square root Y is given by the following equation.

$$\delta = Yr - Y \tag{14}$$

An inverse function value Xr with respect to the function "Y=X$^{\frac{1}{2}}$", *that is, the square* "Xr=Yr2", is calculated on the basis of the interim square root Yr. The inverse function Xr is expressed by the following equation.

$$\begin{aligned} Xr &= Yr^2 \\ &= (Y + \delta)^2 \\ &= X + 2\delta \cdot Y + \delta^2 \\ &= X + \Delta \end{aligned} \tag{15}$$

where $\Delta$ denotes $2\delta \cdot Y + \delta^2$. It is known from the equation (15) that the square Xr is greater than the given value X by the value $\Delta$ or $2\delta \cdot Y + \delta^2$. When the absolute value of the error $\delta$ of the interim square root Yr is smaller than $2^{-53}$, the maximum of the absolute value of the value $\Delta$ or $2\delta \cdot Y + \delta^2$ satisfies the following condition.

$$\begin{aligned} |\Delta|\max &= |2\delta \cdot Y + \delta^2|\max \\ &< 2 \cdot 2^{-53} \cdot 2 + 2^{-106} \\ &< 2^{-51} + 2^{-106} \end{aligned} \tag{16}$$

The relation (16) reveals that the digits in places equal to and above the place having a weight of $2^{-50}$ are always 0 when the absolute value of the value $\Delta$ is represented by a binary number. Since a normalized mantissa part is now assumed, the digits of the given value X in places equal to and below the place having a weight of $2^{-53}$ are always 0. Thus, the non-0 digits of the given value X and the value $\Delta$ overlap at the places having weights of $2^{-51}$ and $2^{-52}$. Therefore, to decide which of the given value X and the square Xr is greater, it is necessary to examine not only the digits in the $2^{-53}$ place and the lower places but also the digits in the higher places.

In the case where the value $\Delta$ is calculated by subtracting the given value X from the square Xr, since the absolute value of the value $\Delta$ is smaller than $2^{-50}$ as understood from the relation (16), the examination of the digits of the subtraction result $\Delta$ in the $2^{-50}$ place and the lower places enables the decision as to which of the given value X and the square Xr is greater. The result of this decision in turn enables the decision as to which of the interim square root Yr and the infinitely precise square root Y is greater, and then a sticky digit S is determined.

Specifically, in the case where the digit of the value $\Delta$ in the $2^{-50}$ place is 0 and at least one of the digits of the value $\Delta$ in the $2^{-51}$ place and the lower places is different from 0, the value $\Delta$ is positive and the interim square root Yr is greater =ban the infinitely precise square root Y, and thus it is good to set the sticky digit S to $-1$. In the case where all the digits of the value $\Delta$ in the $2^{-50}$ place and the lower places are 0, the value $\Delta$ is 0 and the interim square root Yr is equal to the infinitely precise square root Y, and thus it is good to set the sticky digit S to 0. In the case where the digit of the value $\Delta$ in the $2^{-50}$ place is 1, the value $\Delta$ is negative and the interim square root Yr is smaller than the infinitely precise square root Y, and thus it is good to set the sticky digit S to 1.

More accurate square root calculation mares it possible to perform the decision as to which of the given value X and the square Xr is greater by examining only the digits of the square Xr in the $2^{-53}$ place and the lower places. Specifically, in the case where the absolute value of the error $\delta$ of the interim square root Yr is smaller than $2^{-56}$, the relation (16) is replaced by the following relation.

$$|\Delta|max = |2\delta \cdot Y + \delta^2|max \qquad (17)$$
$$< 2 \cdot 2^{-56} \cdot 2 + 2^{-112}$$
$$< 2^{-54} + 2^{-112}$$

The relation (17) reveals that the digits in places equal to and above the place having a weight of $2^{-53}$ are always 0 when the absolute value of the value $\Delta$ is represented by a binary number. Accordingly, the sticky digit S can be easily determined as in the fourth embodiment.

DESCRIPTION OF THE SIXTH PREFERRED EMBODIMENT

Figure 7:
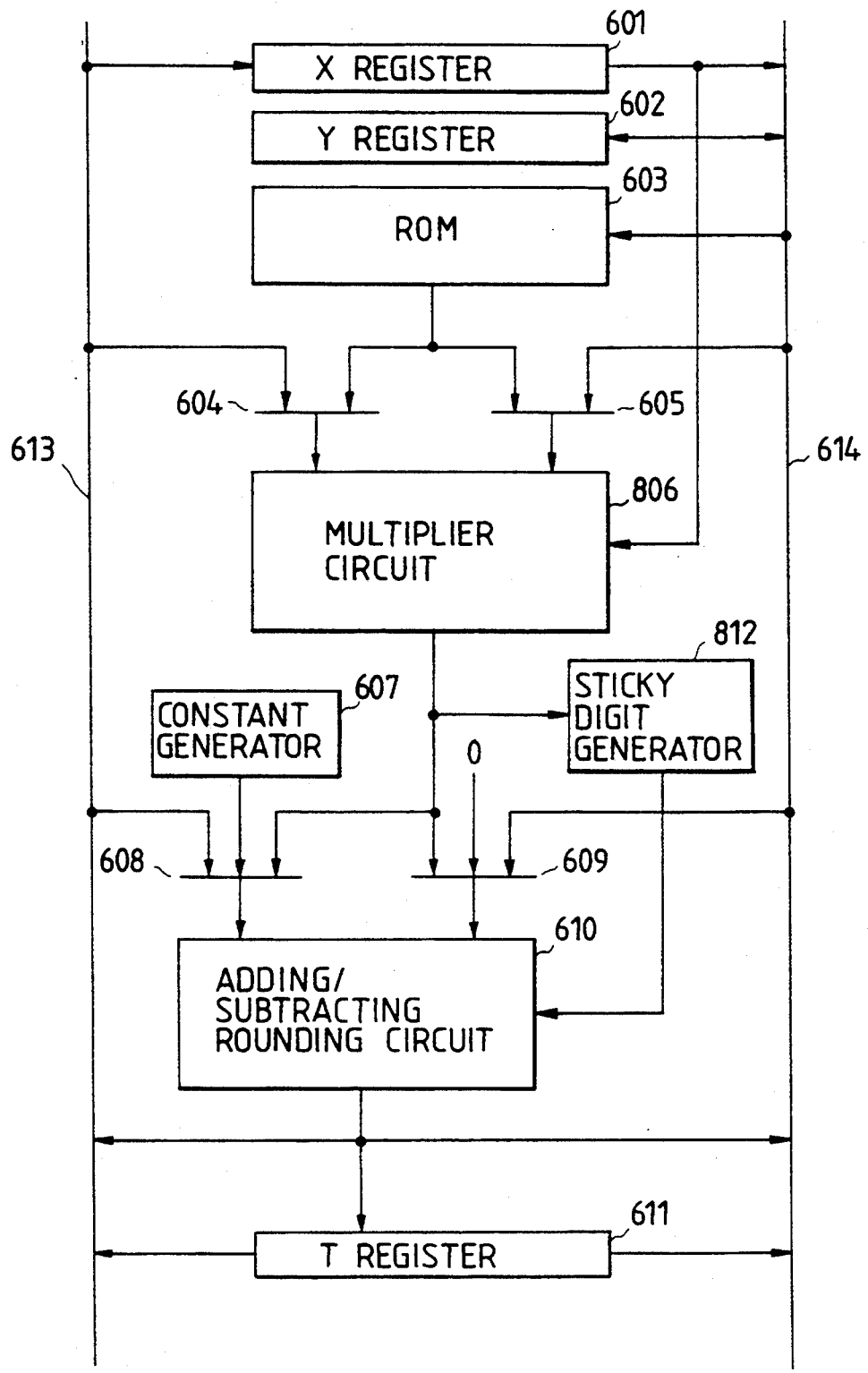
FIG. 7 is a block diagram of an apparatus for executing arithmetic processing in a sixth embodiment of this invention.

A sixth embodiment of this invention is similar to the embodiments of FIGS. 4-6 except for a design change indicated later. FIG. 7 shows an apparatus for executing arithmetic processing in the sixth embodiment. The apparatus of FIG. 7 differs from the apparatus of FIG. 5 as follows. A multiplier circuit 806 is used in place of the multiplier circuit 606. The multiplier circuit 806 receives the output data from the X register 601. A sticky digit generator 812 is used in place of the sticky digit generator 612. The sticky digit generator 812 generates data of a sticky digit S in response to the output data from the multiplier circuit 806. The data of the sticky digit S are fed from the sticky digit generator 812 to the adding/subtracting rounding circuit 610.

Figure 8:
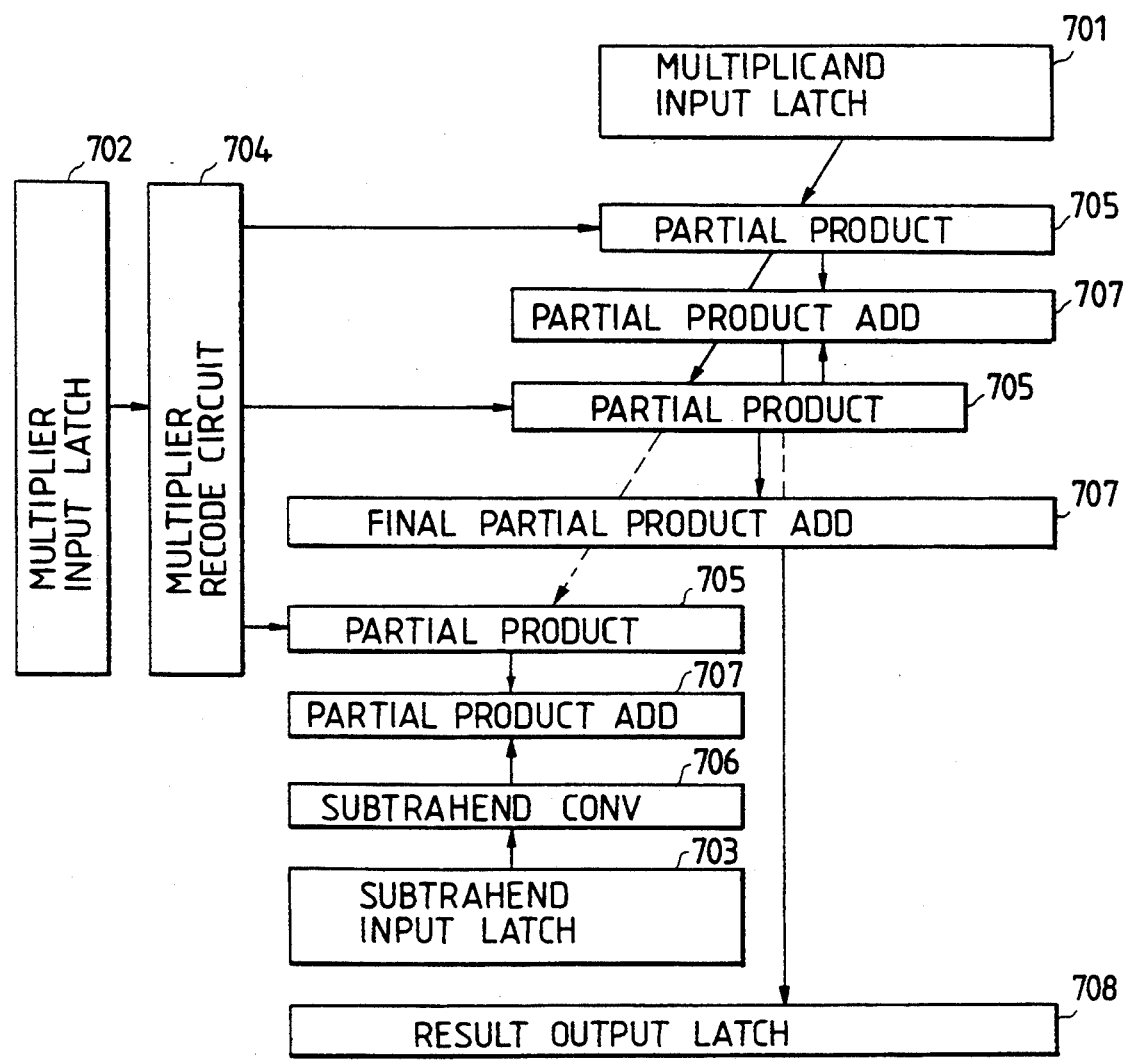
FIG. 8 is a block diagram of the multiplier circuit of FIG. 7.

FIG. 8 shows an internal design of The multiplier circuit 806. In FIG. 8, data of a multiplicand, data of a multiplier, and data of a subtrahend are inputted into and held by a multiplicand input latch 701, a multiplier input latch 702, and a subtrahend input latch 708 respectively. The data of the multiplier are fed from the multiplier input latch 702 to a multiplier recoding circuit 704. The multiplier recoding circuit 704 serves to reduce the number of partial products. When the multiplier recoding circuit 704 uses 2-bit Booth's method for example, the number of partial products can be reduced to a number which approximately equals a half of the number of the digits of the fed multiplier. In 2-bit Booth's method, 2-bit segments of an input binary number are successively converted into one of the values "2", "1", "0", "−1", and "−2". The multiplier recoding circuit 704 outputs data of a recoded multiplier to partial product generation circuits 705. The data of the multiplicand are fed from the multiplicand input latch 701 to the partial product generation circuits 705. The partial product generation circuits 705 generate a plurality of partial products from the recoded multiplier and the multiplicand.

The data of the subtrahend are fed from the subtrahend input latch 703 to a subtrahend conversion circuit 706. The subtrahend conversion circuit 706 generates the sign inversion value of the subtrahend which is expressed in the same format as the format of the partial products of the multiplicand and the multiplier. In the case of a multiplier circuit handling binary numbers in internal calculation, this expression format is based on the complement of the subtrahend with respect to 2. In the case of a multiplier circuit handling redundant binary numbers in internal calculation. This expression format is based on a redundant binary number. The partial products and the sign inversion value of the subtrahend are added by partial product adder circuits 707 in a sequential manner or a tree manner, and the result of this addition is outputted to a multiplication result output latch 708.

As understood from the above description, the multiplier circuit of FIG. 8 can obtain the result of the subtraction of the subtrahend from the product of the multiplicand and the multiplier. The multiplier circuit of FIG. 8 is used as follows. Data of an interim square root Yr are inputted into both of the multiplicand input latch 701 and the multiplier input latch 702. Data of a given value X are inputted into the subtrahend input latch 703. In this case, the data stored in the multiplication result output latch 708 represent a value $\Delta$ expressed by the following equation.

$$\Delta = Yr^2 - X \qquad (18)$$
$$= Xr - X$$

The multiplier circuit of FIG. 8 can calculate one value $\Delta$ at a high speed.

A sticky digit S in square root calculation can be determined by referring to the value $\Delta$ as in the fifth embodiment. Accurate calculation of the digits of the value $\Delta$ in the $2^{-50}$ place and the lower places is sufficient for the determination of the sticky digit S. In addition, calculation of an inverse function is used only in the generation of the sticky digit S. Therefore, the subtrahend input latch 703 and the subtrahend conversion circuit 706 do not require the number of places corresponding to the number of all the digits of the given value X but require only three places which correspond to the two places where the data of the absolute value of the value $\Delta$ and the data of the given value X overlap, and the immediately higher place. Specifically, the three required places correspond to the places having weights of $2^{-50}$, $2^{-51}$, and $2^{-52}$.

In addition, the multiplier circuit of FIG. 8 can be used for division. During the division, the decision as to which of the product Xr and the dividend X is greater can be performed by the multiplier circuit of FIG. 8 while the execution of the subtraction is omitted from the adding/subtracting rounding circuit 610, in response to the result of this decision, the sticky digit generator 812 determines the sticky digit S. The omission of the execution of the subtraction from the adding- /subtracting rounding circuit 610 enables a higher operation speed.

What is claimed is:

1. A computer implemented method of calculating a square root $Y = X^{\frac{1}{2}}$ with respect to a given value X in an arithmetic processing apparatus including an adder and a sticky digit generator, comprising the steps of:

deriving by the processing apparatus an approximate square root Ya at an accuracy at which an error between the approximate square root Ya and an infinitely precise square root Y is smaller than a weight of a digit in a digit place which is lower by two digit places than a least significant digit place for a final square root;

rounding by the processing apparatus the approximate square root Ya to an interim square root Yr equal to one of possible interim square roots which is closest to the approximate square root Ya, the possible interim square roots being represented by digits in predetermined digit places, wherein a lowest order digit place of said predetermined digit places is arbitrarily selected from a range starting from a digit place lower by at least one digit place than the lowest significant digit place for the final square root and ending at a digit place higher by at least one digit place than a digit place of a minimal weight, wherein a weight of a digit in the minimal-weight digit place is greater than a maximum of an error of the approximate square root Ya;

deriving by the processing apparatus a square $Xr = Yr^2$ from the interim square root Yr;

setting by the sticky digit generator a sticky digit S to 0 when the values X and Xr are equal;

setting by the sticky digit generator the sticky digit S to $-1$ when the value X is smaller than the value Xr;

setting by the sticky digit generator the sticky digit S to 1 when the value X is greater than the value Xr;

adding by the adder the sticky digit S to a digit place having an order immediately lower than a lowest order digit place of the interim square root Yr; and rounding by the processing apparatus a result of the adding in a designated rounding mode to obtain the final square root.

2. The method of claim 1 wherein the processing apparatus calculates the approximate square root Ya and the interim square root Yr so that a maximal value of an absolute value of a difference between the values Xr and X will be smaller than a weight of a digit place which is immediately lower than a least significant digit place of the given value X, and including the further step of examining digits by the processing apparatus, in digit places lower than a digit place of a digit of the square Xr which has a weight of the least significant digit place of the value X, to decide a relation in magnitude between the values Xr and X to generate the sticky digit S.

3. An apparatus for calculating a square root $Y = X^{\frac{1}{2}}$ with respect to a given positive value X, comprising:

means for generating a first digital signal representing an approximate square root Ya at an accuracy at which an error between the approximate square root Ya and an infinitely precise square root Y is smaller than a weight of a digit in a digit place which is lower by two digit places than a lowest significant digit place for an output digital signal representing a final square root;

rounding means including an adder for rounding the approximate square root Ya to generate a second digital signal representing an interim square root Yr equal to one of possible interim square roots which is closest to the approximate square root Ya, the possible interim square roots including representations of digits in predetermined digit places, wherein a lowest order digit place of said predetermined digit places is arbitrarily selected from a range starting from a digit place lower by at least one digit than the least significant digit place for the output digital signal representing the final square root and ending at a digit place higher by at least one digit than a digit place of a minimal weight, wherein a weight of a digit in the minimal-weight digit place is greater than a maximum of an error of the approximate square root Ya;

means for generating a third digital signal representing a square $Xr = Yr^2$ derived from a value of said second digital signal representing the interim square root Yr;

a sticky digit generator for generating a fourth digital signal representing the sticky digit S to 0 when the ting means for setting a value of the fourth digital signal representing the sticky digit S to 0 when the values of an input digital signal representing X and of said third digital signal representing Xr are equal;

said setting means operating for setting the value of the fourth digital signal representing the sticky digit S to $-1$ when the value of said input digital signal representing X is smaller than the value of said third digital signal representing Xr;

said setting means operating for setting the value of the fourth digital signal representing the sticky digit S to 1 when the value of said input digital signal representing X is greater than the value of said third digital signal representing Xr;

said adder connected to receive said fourth digital signal representing the sticky digit S and the second digital signal representing the interim square root Yr for adding the sticky digit S to a digit place having an order immediately lower than a lowest order digit place of said second signal representing the interim square root Yr; and for generating an adder output signal; and means for rounding a value of said adder output signal representing a result of the addition in a designated rounding mode to generate the output digital signal representing the final square root.

4. The apparatus of claim 3 comprising further means for calculating values of the approximate square root Ya and the interim square root Yr so that a maximal value of an absolute value of a difference between the values X and Xr represented by said input digital signal and by said third digital signal will be smaller than a weight of a digit place which is immediately lower than a least significant digit place of the given value X, and for examining digits, in digit places lower than a digit place of a digit of the square Xr which has a weight of the least significant digit place of the value X, to decide a relation in magnitude between the values Xr and X to generate the sticky digit S.

* * * * *